(12) United States Patent
Li et al.

(10) Patent No.: US 11,178,610 B2
(45) Date of Patent: Nov. 16, 2021

(54) ADAPTIVE METHOD FOR AGGREGATION OF DISTRIBUTED LOADS TO PROVIDE EMERGENCY FREQUENCY SUPPORT

(71) Applicants: Haifeng Li, Nanjing (CN); Xiao Lu, Nanjing (CN); Yingmeng Xiang, San Jose, CA (US); Chunlei Xu, Nanjing (CN); Di Shi, San Jose, CA (US); Zhe Yu, San Jose, CA (US); Shiming Xu, Nanjing (CN); Xueming Li, Nanjing (CN); Jiangpeng Dai, San Jose, CA (US); Zhiwei Wang, San Jose, CA (US)

(72) Inventors: Haifeng Li, Nanjing (CN); Xiao Lu, Nanjing (CN); Yingmeng Xiang, San Jose, CA (US); Chunlei Xu, Nanjing (CN); Di Shi, San Jose, CA (US); Zhe Yu, San Jose, CA (US); Shiming Xu, Nanjing (CN); Xueming Li, Nanjing (CN); Jiangpeng Dai, San Jose, CA (US); Zhiwei Wang, San Jose, CA (US)

(73) Assignees: STATE GRID CORPORATION OF CHINA, Beijing (CN); GLOBAL ENERGY INTERCONNECTION RESEARCH INSTITUTE NORTH AMERICA, San Jose, CA (US); STATE GRID JIANGSU ELECTRIC POWER COMPANY, Nanjing (CN)

( * ) Notice: Subject to any disclaimer, the term of this patent is extended or adjusted under 35 U.S.C. 154(b) by 294 days.

(21) Appl. No.: 16/392,509

(22) Filed: Apr. 23, 2019

(65) Prior Publication Data

US 2019/0380091 A1 Dec. 12, 2019

Related U.S. Application Data

(60) Provisional application No. 62/681,806, filed on Jun. 7, 2018.

(51) Int. Cl.
*G05B 13/04* (2006.01)
*H04W 52/02* (2009.01)
(Continued)

(52) U.S. Cl.
CPC ...... *H04W 52/0212* (2013.01); *G05B 13/042* (2013.01); *G06F 1/3209* (2013.01);
(Continued)

(58) Field of Classification Search
CPC ........... H04W 52/0212; H04W 52/0274; H02J 3/0012; H02J 3/14; G05B 13/042;
(Continued)

(56) References Cited

U.S. PATENT DOCUMENTS 6,314,378 B1 * 11/2001 Hodge .............. H02J 3/14
702/57
7,242,114 B1 * 7/2007 Cannon ............. H02J 3/14
307/129
(Continued)

*Primary Examiner* — Gary Collins
(74) *Attorney, Agent, or Firm* — PowerPatent Inc.; Bao Tran

(57) ABSTRACT

Systems and methods are disclosed for power management by estimating power contingency of a grid at a cloud control center; performing decentralized real-time measurement and making local decisions at one more computer controlled outlets connected to the grid; and aggregating distributed loads to provide emergency frequency support to the grid.

17 Claims, 11 Drawing Sheets

(51) Int. Cl.
    *G06F 1/3287*    (2019.01)
    *G06F 1/3209*    (2019.01)
    *H02J 3/00*      (2006.01)
    *H02J 3/14*      (2006.01)

(52) U.S. Cl.
    CPC .......... *G06F 1/3287* (2013.01); *H02J 3/0012* (2020.01); *H02J 3/14* (2013.01); *H04W 52/0274* (2013.01); *Y02B 70/3225* (2013.01); *Y02B 90/20* (2013.01); *Y04S 20/222* (2013.01)

(58) Field of Classification Search
    CPC ... G05F 1/3209; Y02B 70/3225; Y02B 90/20; Y04S 20/222
    See application file for complete search history.

(56)    References Cited

U.S. PATENT DOCUMENTS

2013/0321040 A1* 12/2013 Johal .................. H02J 3/24
                                                    327/113
    2019/0027933 A1* 1/2019 Lian .................... H02J 3/00

\* cited by examiner

ADAPTIVE METHOD FOR AGGREGATION OF DISTRIBUTED LOADS TO PROVIDE EMERGENCY FREQUENCY SUPPORT

TECHNICAL FIELD

This invention relates to grid power management.

BACKGROUND

It is a critical requirement to ensure the power system frequency stability in order to provide reliable and secure power supply to the customers. The system frequency deviation is resulted as a mismatch between the load demand and the power generation due to the loss of generators, tripping of transmission lines, fluctuation of load demands, variation of the renewable generations, etc. In recent years, with the increasing penetration of power electronics interfaced generators, intermittency of the renewable generations, and arising cyber-physical threats, it becomes more challenging to maintain the frequency stability. For example, if a large generator or a tie-line carrying gigawatts of power is suddenly tripped due to lighting, grounding fault, or cyberattack, there will be a huge power imbalance in the power grid, the frequency will drop rapidly and may cause great blackouts, like happened in the 2003 Northeast Blackout in the US and Canada.

In the past, many frequency control schemes have been developed at/under different time scales and scenarios. Conventional hierarchical control including primary, secondary, and tertiary loops was designed to deal with trivial/mild disturbances, but they often become ineffective in the case of great disturbances or contingencies. Under-frequency load shedding (UFLS) schemes belong to special protection systems, and can cut off the load of an entire area connected to a substation or a feeder when the frequency drops to a pre-defined value, but such UFLS schemes suffer from the problem of low granularity as they could not distinguish the critical loads from the trivial loads. Also, UFLS schemes are passive methods, and could not actively respond upon the occurrence of a major disturbance before the frequency drops severely.

Recently, some demand response strategies including direct load control were instant as alternative frequency regulation approaches. However, their control strategies were usually centralized and heavily rely on the communication network to transfer the commands when needed, which is a heavy burden of the communication network, and make them unable to rapidly response to major contingencies, e.g., the sudden tripping of an HVDC line or major generator that can cause severe system frequency drop within seconds. While there are some distributed frequency control methods in the literature [3], they are often not adaptive to the variation of power system states and lack adequate coordination between the devices.

Thus, in this invention, a practical hybrid strategy is instant, and the principle is online contingency estimation and centralized parameter setting for the cloud-based control center, and real-time measurement and decentralized decision making for the locally/remotely controlled outlet. The instant hybrid strategy is robust and adaptive, and its performance is validated by numerical simulations.

SUMMARY OF THE INVENTION

In one aspect, systems and methods are disclosed for power management by estimating power contingency of a grid at a cloud control center; performing decentralized real-time measurement and making local decisions at one more computer controlled outlets connected to the grid; and aggregating distributed loads to provide emergency frequency support to the grid.

In another aspect, an adaptive method for aggregation of distributed loads to provide emergency frequency support is described. This method consists of centralized online contingency estimation and parameter setting of the cloud control center, as well as the decentralized real-time measurement and local decision-making of the smart outlets. The instant method works with a smart outlet network consisting of a large number of smart outlets, the communication network and a cloud control center. In the cloud control center, the decision-making for frequency control involves two major steps: (1) calculate the amount of flexible loads that need to shed based on the power system state, total amount of flexible loads, importance of the flexible loads, as well as the possible contingencies; (2) analyze the switching-off conditions of the smart outlets and send these conditions to the smart outlets. The decision-making of the control center is usually conducted every few minutes. For the smart outlets, the control involves two major steps: (1) Continuously measure the frequency of the power system; (2) Switch off the appliances when the switching-off conditions are satisfied, or when the switching-off commands sent from the cloud control center is received. The decision-making of the control center is usually conducted in milliseconds/seconds after the disturbance.

Advantages of the system may include one or more of the following. The instant method is adaptive, robust, cost-effective, and fast-responsive. This method can adapt to different power system operation states, rapidly respond to frequency disturbances with fast local frequency tracking and control decision-making. Also, the cost of load shedding is reduced due to the wide-area smart outlet coordination and global optimization in the cloud control center. The system can respond quickly to the increasing load demand, intermittent renewable integration, and potential risks from cyber-physical threats, and can work with aggregated flexible load demands to perform frequency regulation service, especially emergency frequency support in case of a major generator/line loss. The system provides adaptive method for aggregation of distributed loads to provide emergency frequency support. This method combines the centralized online contingency estimation and parameter setting of the cloud control center, and the decentralized real-time measurement and local decision-making of the smart outlets. The system is fast, robust and cost-effective compared with the existing techniques like UFLS and centralized direct load control.

BRIEF DESCRIPTIONS OF FIGURES

Figure 7:
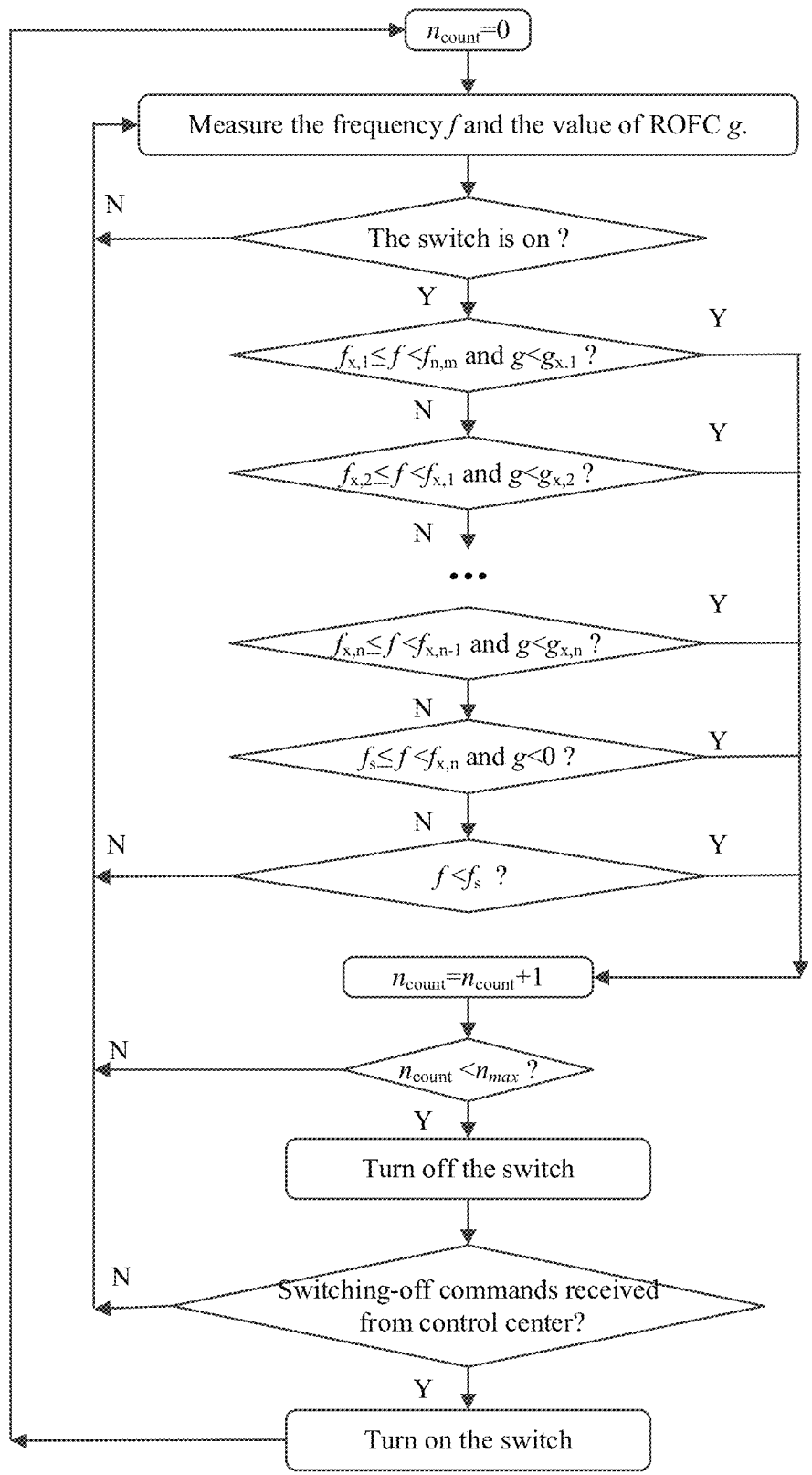
Figure 8:
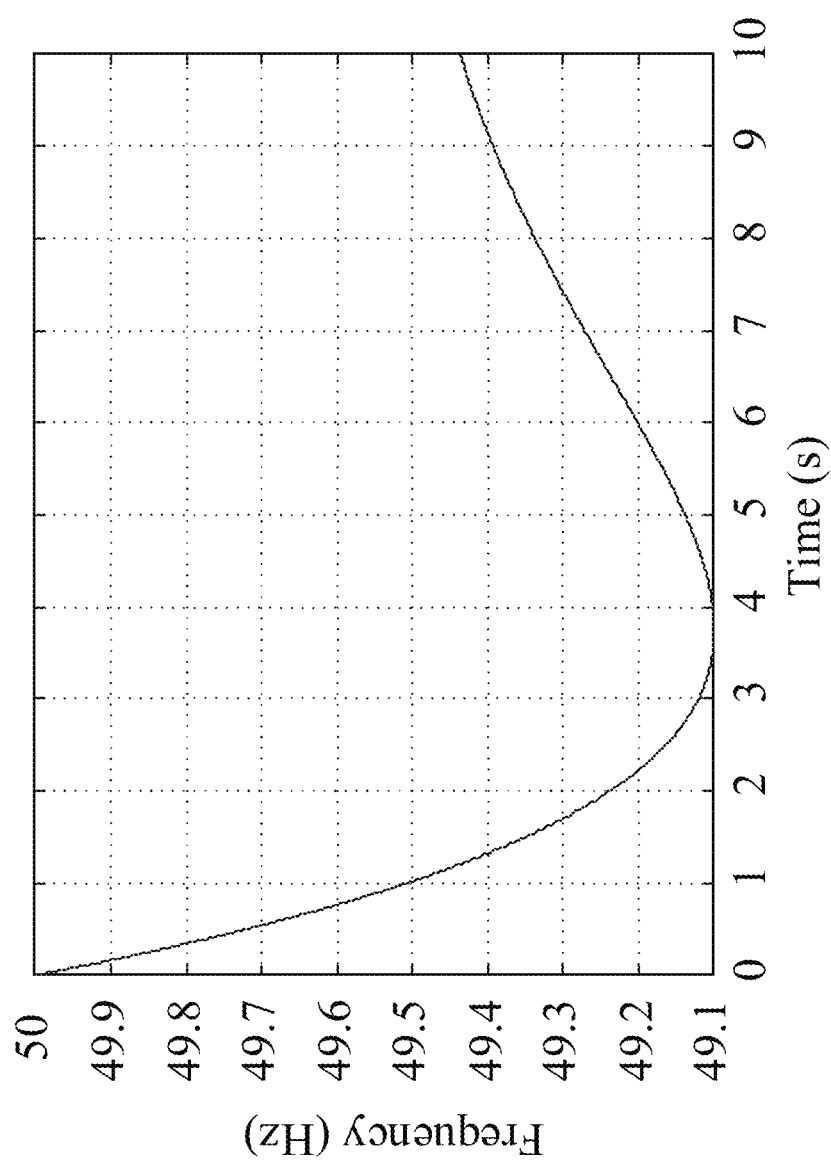
Figure 9:
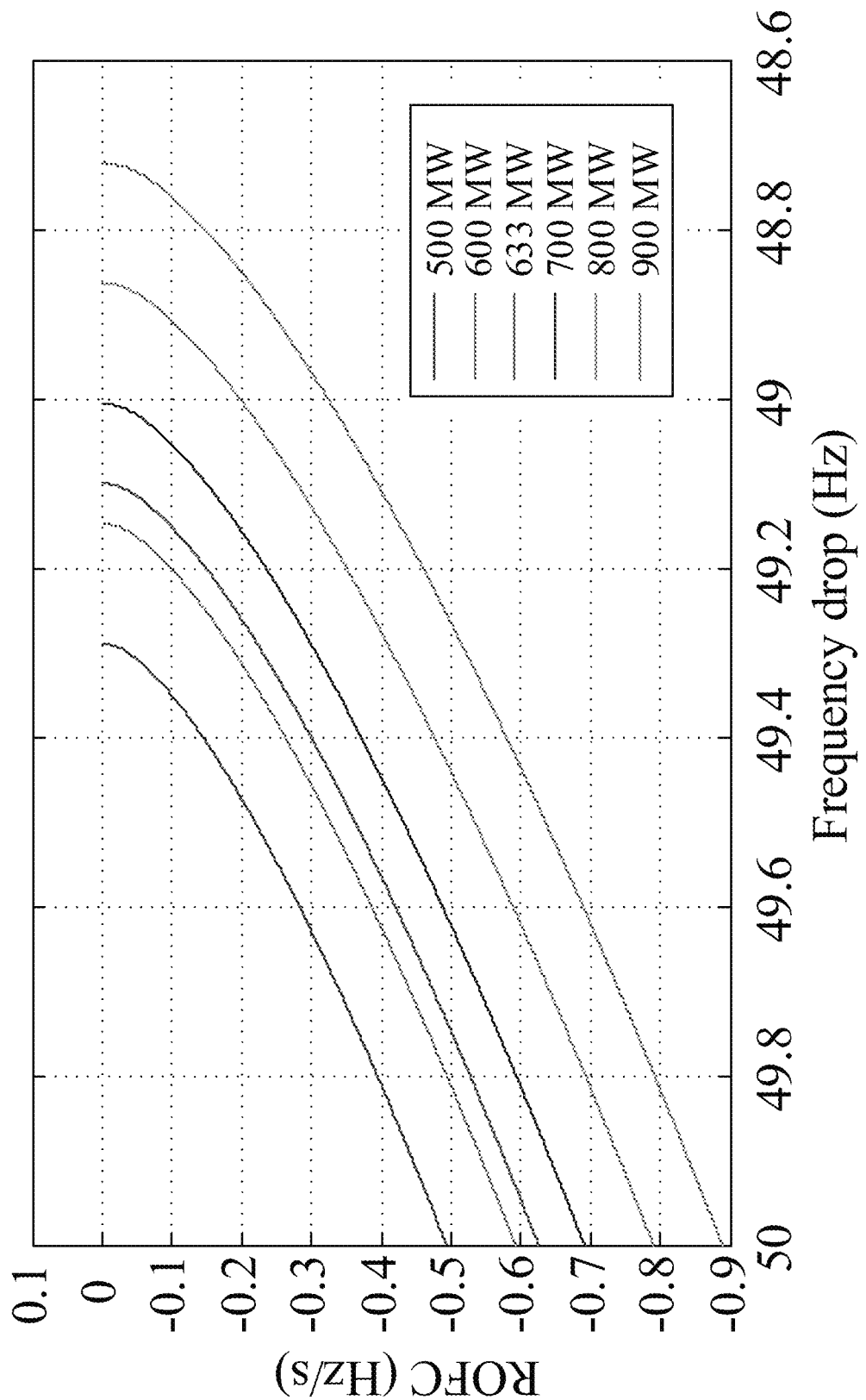
Figure 10:
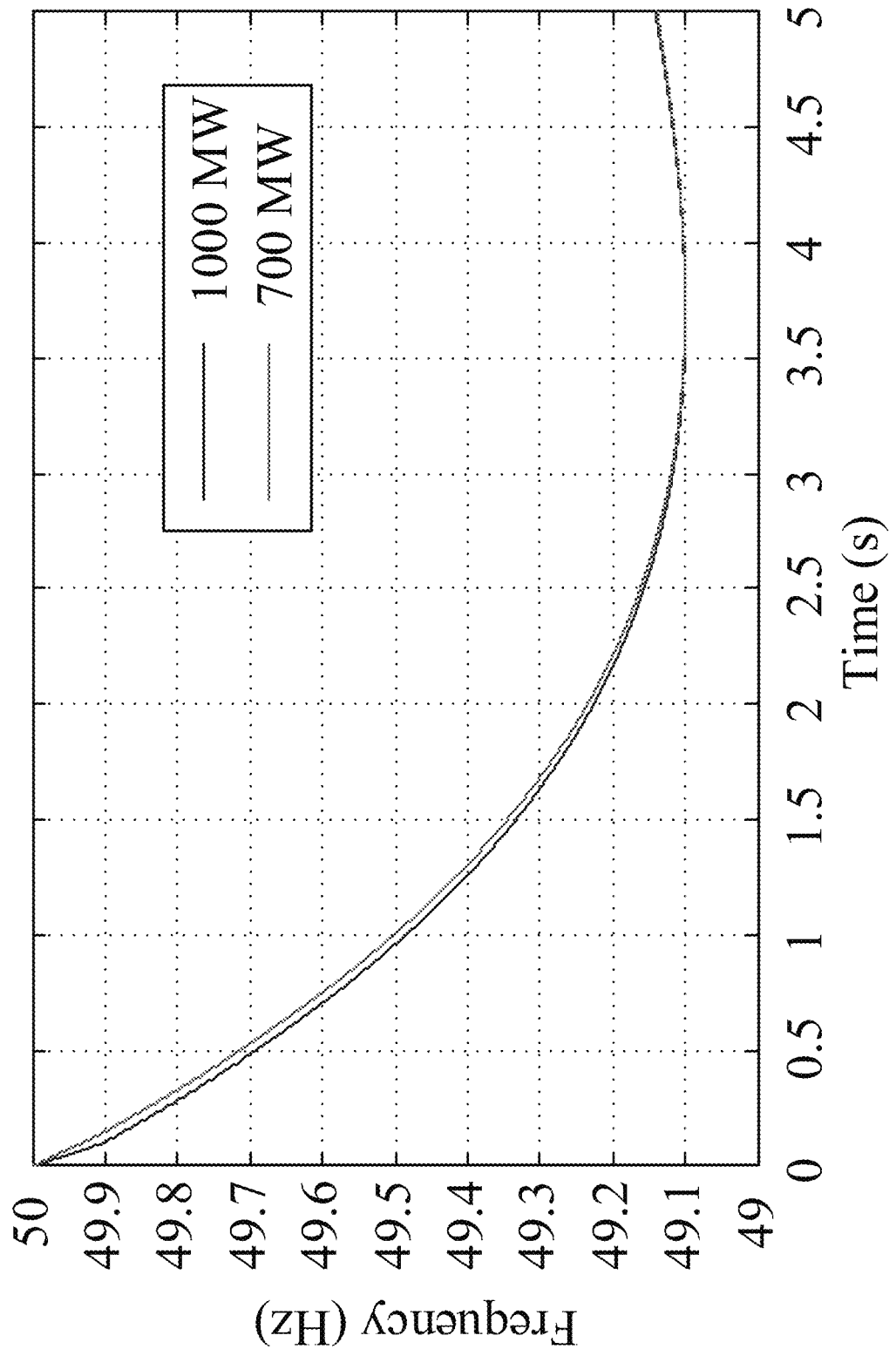
Figure 11:
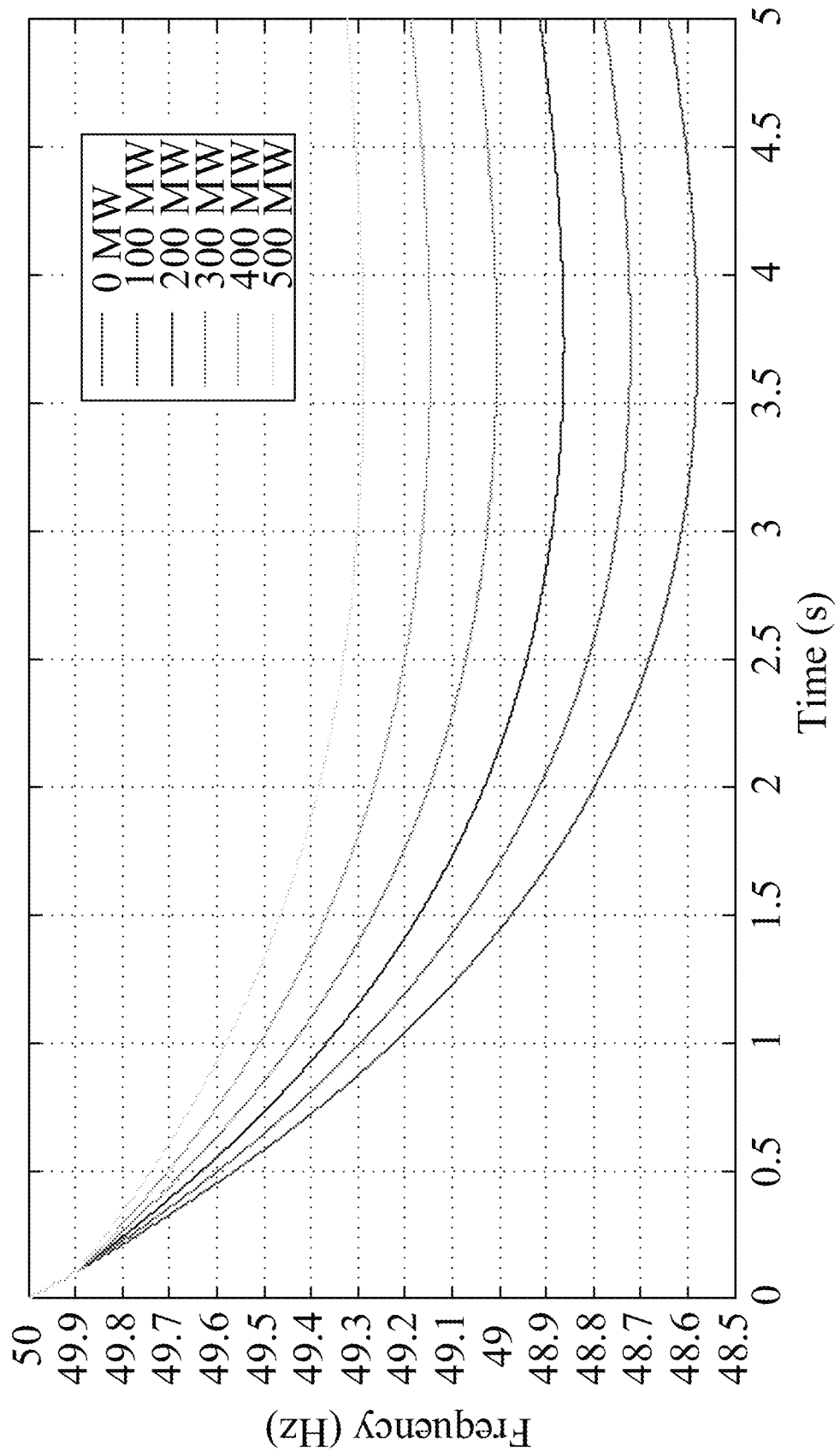

FIG. 7 shows an exemplary smart outlet control strategy for frequency regulation FIG. 8 shows an exemplary frequency drop in case of 633 MW power loss FIG. 9 shows an exemplary sensitivity analysis for the relationship between the ROFC and frequency drop FIG. 10 shows an exemplary frequency regulation performance of the instant method with sufficient load FIG. 11 shows an exemplary influence of the amount of controllable power

DETAILED DESCRIPTION OF THE ILLUSTRATED EMBODIMENTS

Figure 1:
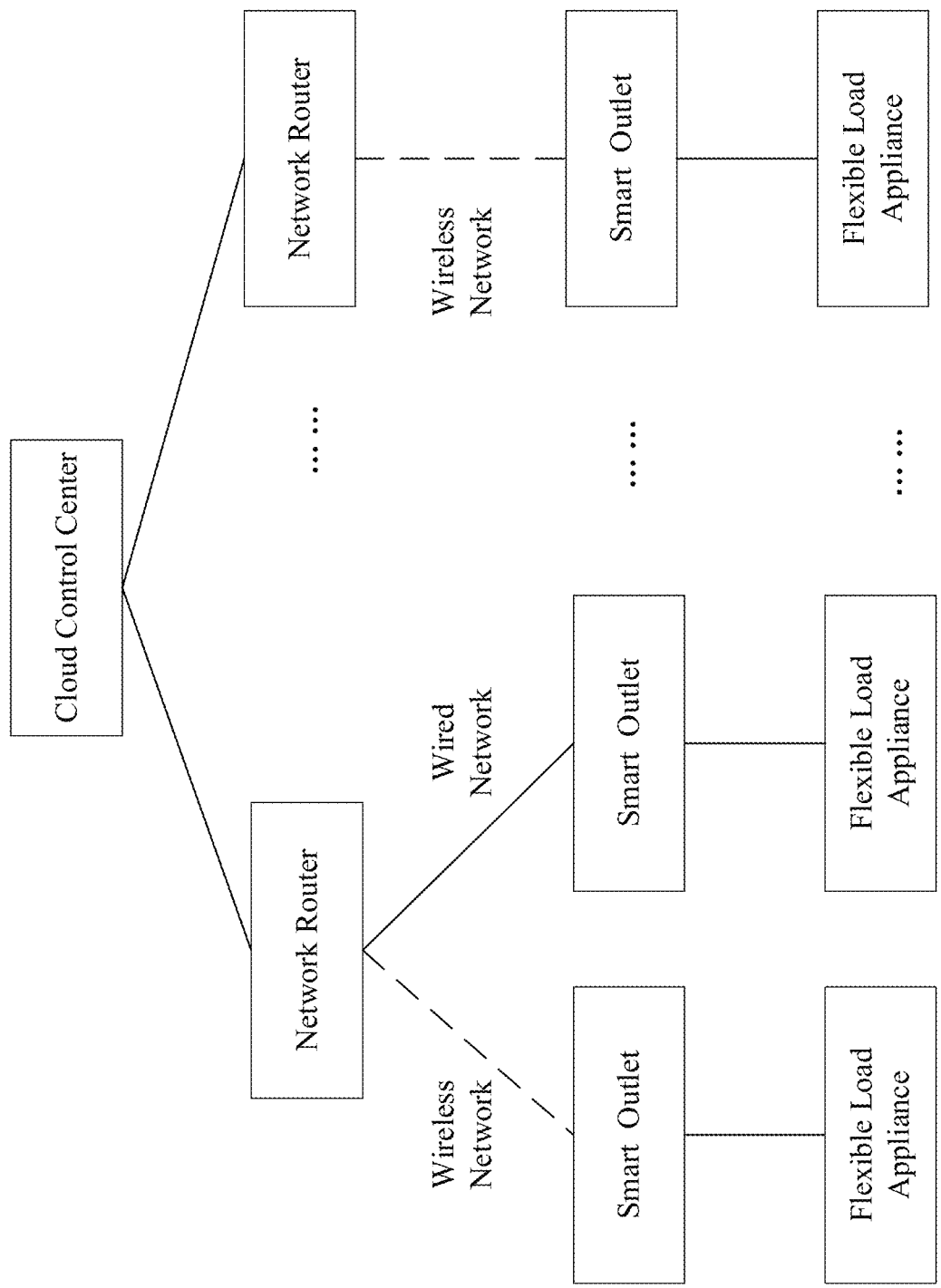
FIG. 1 shows an exemplary smart outlet network
Figure 2:
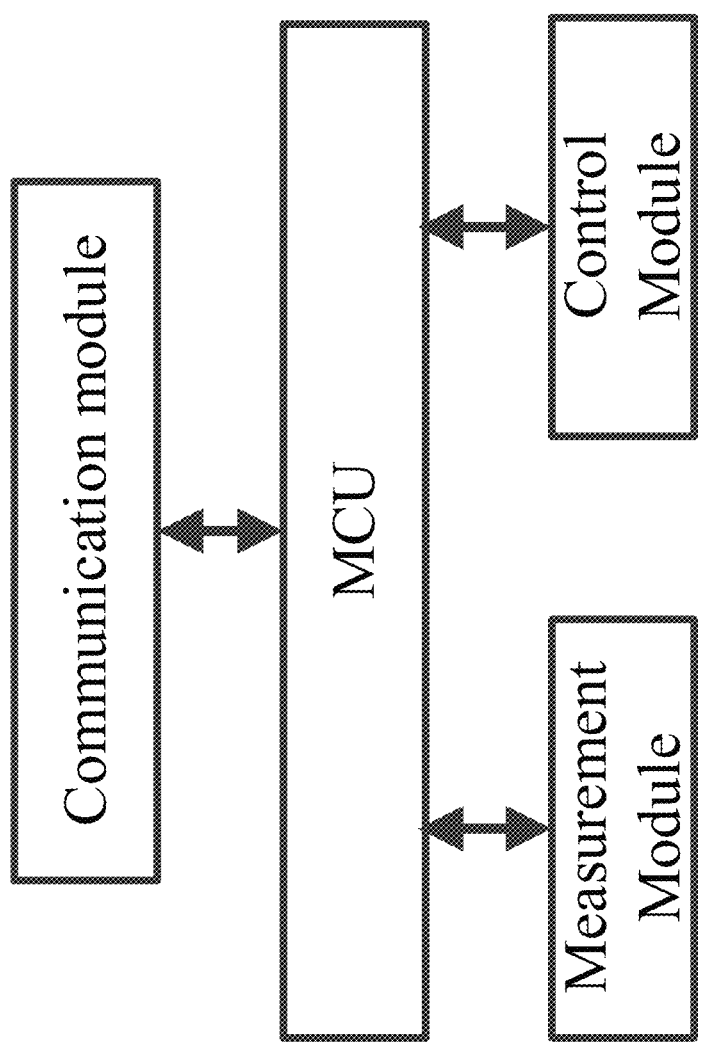
FIG. 2 shows an exemplary Smart outlet structure

For simplicity, the following adaptive frequency control method for utilizing aggregated flexible load demand to provide emergency frequency support service is based on the smart outlet network illustrated in FIG. 1. The smart outlet network consists of a large number of smart outlets, the communication network and a cloud control center. The smart outlet basically consists of a Microcontroller Unit (MCU), a measurement module, a control module, and a communication module, as shown in FIG. 2. The smart outlet can measure the voltage, current, frequency and power of the appliance connected to it using the measurement module, control the switching (e.g., on/off) of the appliance using the control module, communicate with the cloud control center using the communication module. All the computation work of the smart outlet is conducted using the MCU. A smart outlet collects to the network router via wireless communication (e.g., Wifi and Lora) or wired communication (e.g., Ethernet). The cloud control center can receive, store, and analyze the measurements sent from the smart outlets, send the control and setting commands to the smart outlets.

Based on the smart outlet network, an adaptive method for aggregation of distributed loads to provide emergency frequency support is instant. It combines the centralized online contingency estimation and parameter setting at the cloud control center, with the decentralized real-time measurement and local decision-making of smart outlets. The detail is explained as follows.

Determination of Minimal Controllable Load Required

Figure 3:
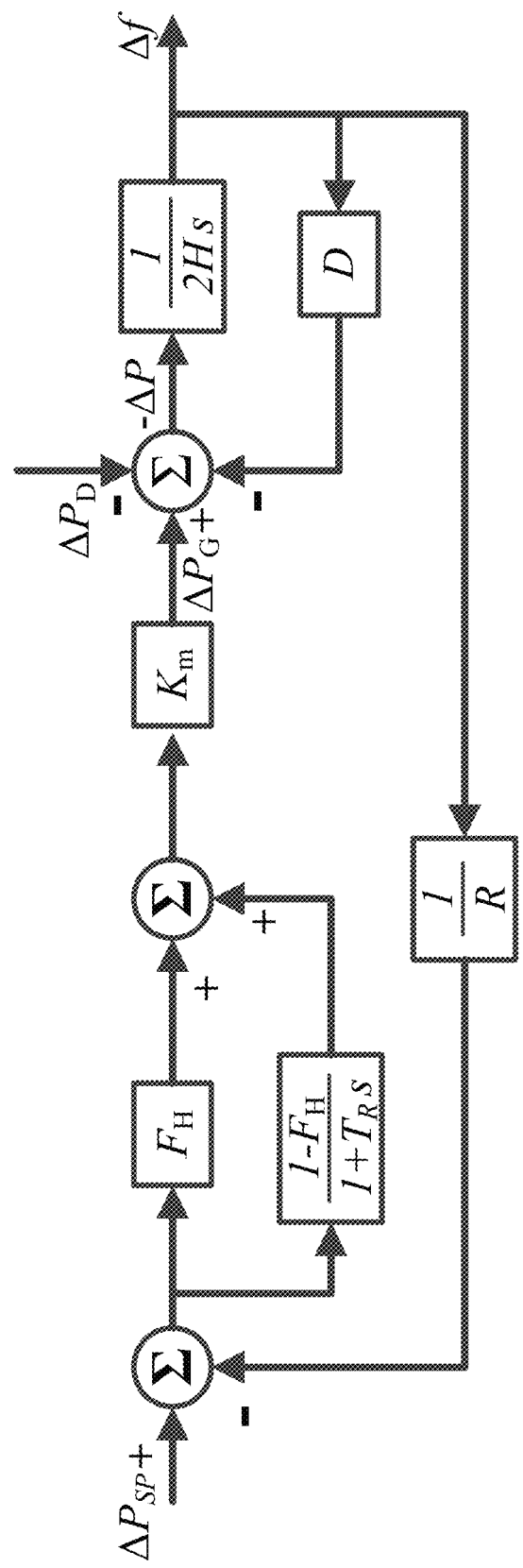
FIG. 3 shows an exemplary frequency response model of power system
Figure 4:
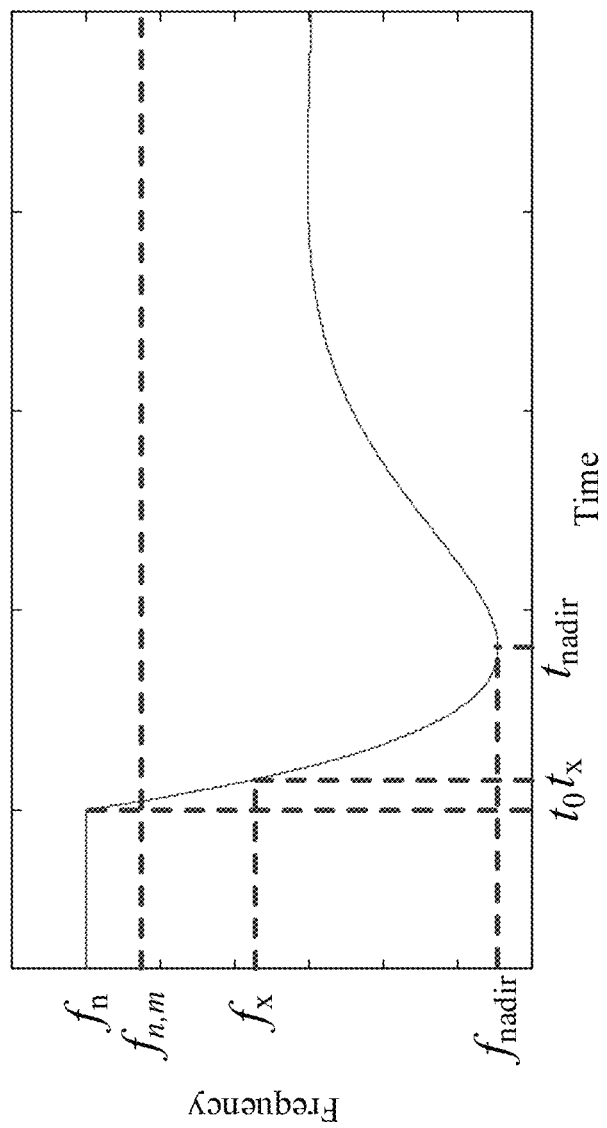
FIG. 4 shows an exemplary system dynamics following a power deficit

This section presents the calculation of the amount of load curtailment in case of a serious contingency, e.g., a sudden loss of the generator or increase of the load. Based on the frequency response model of the power system in FIG. 3, the frequency will decrease rapidly until a minimum frequency (denoted by $f_{nadir}$) is reached due to the inertia of the generators and the frequency response of the load demands. Then the frequency will increase until a new equilibrium is achieved. A typical power system frequency dynamics in response to severe power loss is shown in FIG. 4. In FIG. 3, $\Delta P_G(t)$ is the total increase of the power generation in per unit at time t; $\Delta P_D(t)$ is the total increase of load demand in per unit at time t; D is the amount of load damping which indicates the sensitivity of the load in response to frequency change; $\Delta f(t)$ is the frequency change in per unit; H is the equivalent inertia constant of the system; $\Delta P_{SP}$ is the change of the generator power set point; $F_H$ is the fraction of the power generator by the reheat turbine; $T_R$ is the average reheat time constant; $K_m$ is the power gain factor; R is a constant of the governor speed-droop control. It takes time to change the generator power set point, and $\Delta P_{SP}$ is ignored in most cases.

When a power mismatch between the generation and load demand suddenly happens, the system frequency will experience a dynamic change until a new equilibrium is reached.

Using the Laplace transform, the frequency response to the power imbalance in the frequency domain can be calculated as $$\Delta f(s) = \frac{R\omega_n^2}{DR + K_m} \cdot \frac{1 + T_R s}{s^2 + \zeta\omega_n s + \omega_n^2} \cdot \frac{-\Delta P}{s} \quad (1)$$

where $$\omega_n = \sqrt{\frac{DR + K_m}{2HR \cdot T_R}} \quad (2)$$

$$\zeta = \frac{2HR + (DR + K_m F_H)T_R}{2(DR + K_m)}\omega_n \quad (3)$$

Based on (1), the frequency response in the time domain can be computed by inverse Laplace transform, $$\Delta f(t) = -\frac{R\Delta P}{DR + K_m}[1 + \alpha e^{-\zeta\omega_n t}\sin(\omega_r t + \phi)] \quad (4)$$

where $$\alpha = \sqrt{\frac{1 - 2T_R\zeta\omega_n + T_R^2\omega_n^2}{1 - \zeta^2}} \quad (5)$$

$$\omega_r = \omega_n\sqrt{1 - \zeta^2} \quad (6)$$

$$\phi = \phi_1 - \phi_2 = \tan^{-1}\left(\frac{T_R\omega_r}{1 - \zeta\omega_n T_R}\right) - \tan^{-1}\left(\frac{\sqrt{1 - \zeta^2}}{-\zeta}\right) \quad (7)$$

When there are multiple sudden power changes at different times, the frequency response is $$\Delta f(t) = -\sum_j \frac{R\Delta P(t_j)}{DR + K_m}\{1 + \alpha e^{-\zeta\omega_n(t - t_j)}\sin[\omega_r(t - t_j) + \phi]\} \quad (8)$$

where $\Delta P(t_j)$ is the sudden power loss at time $t_j$.

Given the initial power loss $\Delta P$ at time $t_0 = 0$, the rate of frequency change (ROFC) g(t) can be calculated as $$g(t) = \frac{d\Delta f(t)}{dt} = -\frac{\alpha\omega_n R\Delta P}{DR + K_m}e^{-\zeta\omega_n t}\sin(\omega_r t + \phi_1) \quad (9)$$

When the ROFC is zero, the minimum frequency $f_{nadir}$ is obtained. Thus, the time $t_{nadir}$ taken to reach $f_{nadir}$ can be computed as follows $$t_{nadir} = \frac{\pi - \phi_1}{\omega_r} = \frac{1}{\omega_r}\tan^{-1}\left(\frac{T_R\omega_r}{\zeta\omega_n T_R - 1}\right) \quad (10)$$

Thus, $f_{nadir}$ can be obtained based on the following equation [5].

$$f_{nadir} = f_n - \frac{R\Delta P}{DR + K_m}[1 + \alpha e^{-\zeta\omega_n t_{nadir}}\sin(\omega_r t_{nadir} + \phi)] \quad (11)$$

where $f_n$ is the pre-contingency frequency of the steady state, and it is typically 1 in per unit.

One principle of the instant method is to ensure the system frequency does not drop to the point of conventional under frequency load shedding (UFLS) while minimizing the amount of load shedding by the smart outlets. The starting frequency of the UFLS can be different for different systems. For safety, a frequency slightly higher than the starting frequency of the UFLS, denoted as $f_s$, is chosen as the objective for the frequency control. Hence, the threshold power loss $\Delta P_s$ which makes the frequency drop to $f_s$ as the nadir frequency can be calculated as $$\Delta P_s = \frac{(f_n - f_s) \times (DR + K_m)}{R \times [1 + \alpha e^{-\zeta \omega_n t_{nadir}} \sin(\omega_r t_{nadir} + \emptyset)]} \quad (12)$$

The cloud control center can receive the measurements from the widely distributed smart outlets and predict the possible contingencies. Assume the maximum amount of sudden power deficit that could be induced among all the contingencies is $\Delta P_{max}$. The minimal controllable power $\Delta P_v$ that needs to be shed to prevent the frequency from dropping below $f_s$ is calculated as $$\Delta P_v = \begin{cases} \Delta P_{max} - \Delta P_s & \text{if } \Delta P_{max} > \Delta P_s \\ 0 & \text{if } \Delta P_{max} \leq \Delta P_s \end{cases} \quad (13)$$

Switching-Off Conditions of Smart Outlets

Figure 5:
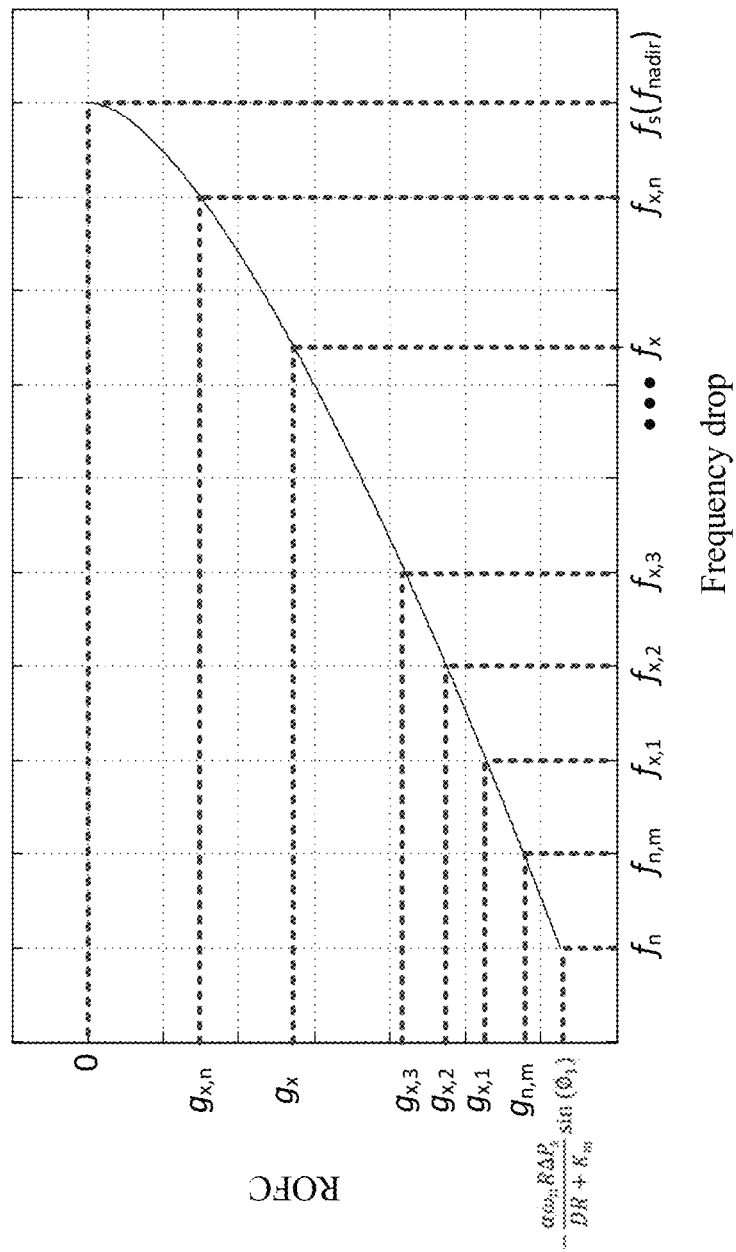
FIG. 5 shows an exemplary relationship between the ROFC and frequency drop

An adaptive and robust control strategy for the smart outlets is instant. A typical relationship between the ROFC and the frequency can be represented as shown in FIG. 5. Right after the loss of power $\Delta P_s$ at time at any time $t_x$, the corresponding frequency value $f_x$ and ROFC value $g_x$ can be obtained as $$f_x = f_n - \frac{R \Delta P_s}{DR + K_m} [1 + \alpha e^{-\zeta \omega_n t_x} \sin(\omega_r t_x + \emptyset)] \quad (14)$$

$$g_x = -\frac{\alpha \omega_n R \Delta P_s}{DR + K_m} e^{-\zeta \omega_n t_x} \sin(\omega_r t_x + \emptyset_1) \quad (15)$$

Thus, the control strategy of the smart outlets in response to the frequency drop is described as follows. If the real-time frequency measurement is $f_x$, and at the same time the ROFC measurement is lower than $g_x$, the switching-off condition is satisfied. For robustness, the smart outlet will switch off when the switching-off condition is satisfied for multiple times.

TABLE I

Switching-off conditions of the smart outlets

| Frequency range | Switching-off conditions |
| --- | --- |
| $[f_{n, m}, \infty)$ | N/A |
| $[f_{x, 1}, f_{n, m})$ | ROFC < $g_{x, 1}$ |
| $[f_{x, 2}, f_{x, 1})$ | ROFC < $g_{x, 2}$ |
| ... | ... |
| $[f_{x, n}, f_{x, n-1})$ | ROFC < $g_{x, n}$ |
| $[f_s, f_{x, n})$ | ROFC < 0 |
| $(-\infty, f_s)$ | Unconditional switching-off |

Further, the control strategy is elaborated considering more practical factors as follows. (1) The power system frequency may fluctuate in the normal operation. The smart outlets should not switch off within this normal range in order to avoid the mis-tripping caused by noises or measurement errors. (2) In the curve shown in FIG. 5, there is an infinite number of the ($f_x$, $g_x$) pairs. It is not realistic to store every pair, as the storage within the smart outlet is limited. Also, the control strategy should not be too complicated. Thus, the frequency range between $f_s$ and $f_n$ is divided into a number of pieces, and the switching-off conditions of the smart outlets are presented in Table I.

Overall Control Strategy

The overall control strategy consisting of the cloud control center and the smart outlets are explained as follows. The smart outlets measure the voltage, current, active power, reactive power, frequency, ROFC and switch status, etc. of the plugged-in appliances in real-time continuously. Also, the smart outlets periodically send the measurements to the cloud to keep the control center updated about the statuses of smart outlets. The control center aggregates the widely distributed smart outlets into hierarchical blocks considering the types of appliances and their locations. Based on the measurements sent from the smart outlets, the total power of each block, as well as the total power $P_{total}$ of all the blocks, can be obtained. These blocks serve as the basis for the control and management of the smart outlets. The blocks are not fixed but can dynamically change, merge or divide as needed.

The cloud control center has communication with the control center of the power system and can even be regarded as part of the power system energy management system (EMS). Based on the information from the control center of the power system, the cloud control center can update its power system model and parameters, including the equations (1)-(14).

Figure 6:
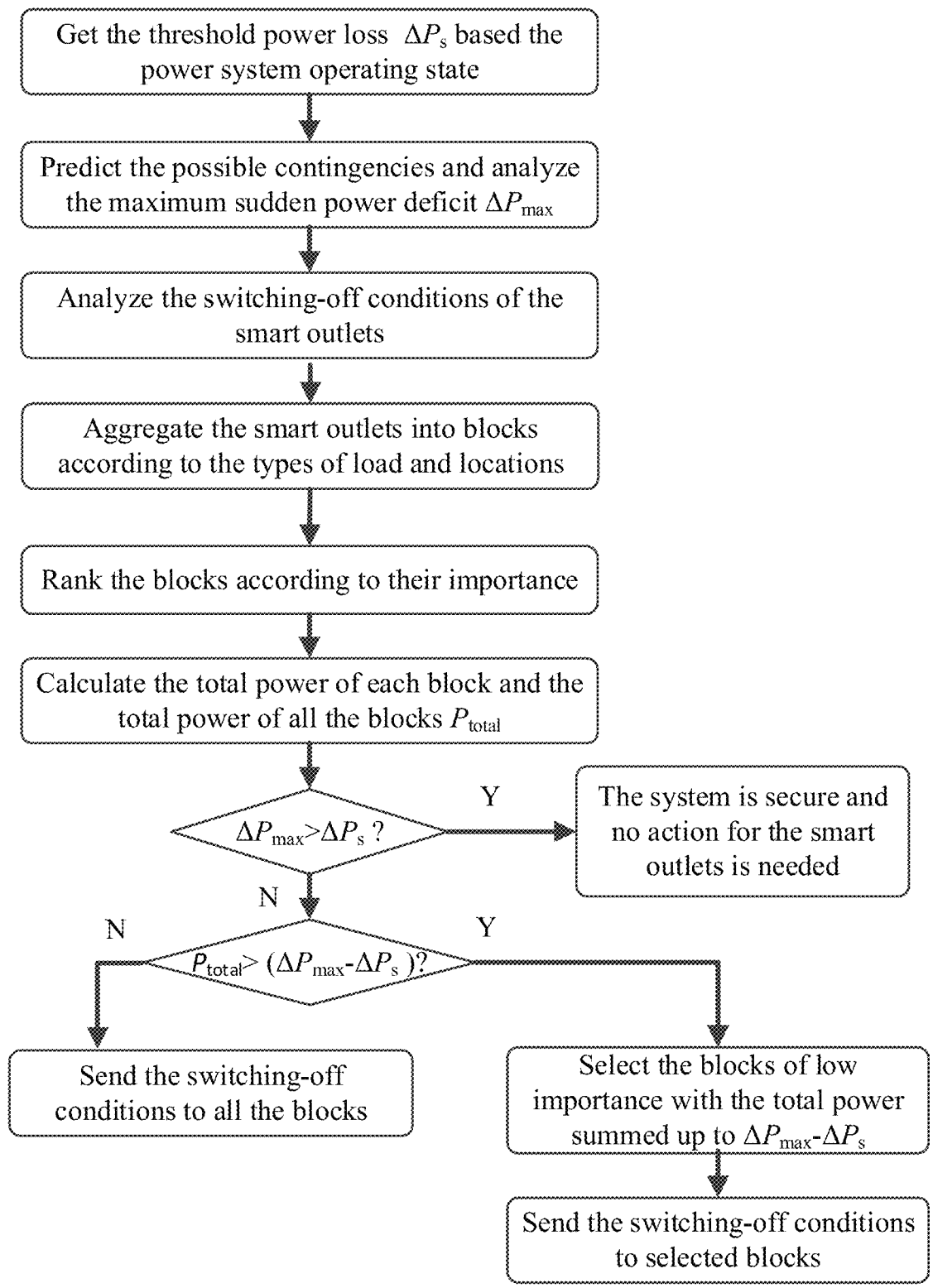
FIG. 6 shows an exemplary control strategy of the cloud control center

The major control strategy of the cloud control center is described in FIG. 6. Since the power system state estimation is updated every a few minutes, the control strategy shown in FIG. 6 needs to be updated every a few minutes in accordance with the state estimation. Also, when there are abundant controllable loads, i.e., $P_{total} > \Delta P_{max} - \Delta P_s$, only a selected amount of smart outlet load blocks are needed to prevent the system frequency from decreasing to below $f_s$, and the relatively non-critical load blocks can be chosen with a priority. For the rest load blocks, they can stand by, be used to prevent the frequency drop, or be used for frequency restoration.

Based on the parameter setting sent from the control center, the flow chart of the smart outlet control is shown in FIG. 7.

Case Studies

In order to verify the performance of the instant control method for emergency frequency support, case studies are performed using a modified IEEE 24-bus system. The original system [6] has 32 generators, and in this modified system the three generators on bus 23 are removed and an interconnection line between bus 23 and an external system is added. Assume the rated power of the interconnection line is 1000 MVA, thus the tripping of the interconnection line is often most serious single contingency.

The parameters used in the power system frequency dynamics model are explained as follows. The inertia constant H and the constant of the governor speed-droop control R are 5.8 s and ¹⁄₁₇ for a generator whose rated power is less than 100 MW, respectively; 8.1 s and ¹⁄₂₀ for rated power between 100 MW and 200 MW, respectively; 9.3 s and ¹⁄₂₂ for rated power larger than 200 MW, respectively. D is 2.5, $F_H$ is 0.3, TR is 8 and Km is 0.95. Based on the above parameters, it is calculated that $t_{nadir}$ is 3.72 seconds. 49.1

Hz is chosen as the desired nadir frequency, the threshold power loss $\Delta P_s$ is 633 MW which makes the frequency drop to the minimum frequency 49.1 Hz, as shown in FIG. 8.

The sensitivity analysis for the relationship between the ROFC and the frequency drop is conducted for different power loss cases, as shown in FIG. 9. It can be seen that at any frequency (e.g., 59.2 Hz), the ROFC for a higher power loss is larger than the ROFC for a lower power loss, which validates the ROFC can be used an accurate index for detecting and responding to a contingency.

Thus, the specific switching-off conditions of the smart outlets can be obtained as in Table II.

TABLE II

Specific switching-off conditions of the smart outlets

| Condition number | Frequency range | Switching-off conditions |
|---|---|---|
| 1 | [49.8, 49.9) | ROFC < −0.528 Hz/s |
| 2 | [49.7, 49.8) | ROFC < −0.476 Hz/s |
| 3 | [49.6, 49.7) | ROFC < −0.421 Hz/s |
| 4 | [49.5, 49.6) | ROFC < −0.363 Hz/s |
| 5 | [49.4, 49.5) | ROFC < −0.300 Hz/s |
| 6 | [49.3, 49.4) | ROFC < −0.231 Hz/s |
| 7 | [49.2, 49.3) | ROFC < −0.150 Hz/s |
| 8 | [49.1, 49.2) | ROFC < 0 |
| 9 | [−∞, 49.1) | Unconditional switching-off |

TABLE III

Influence of measurement error on the smart outlet response

| Maximum random error (%) | Response rate |
|---|---|
| 0 | 1.00000000 |
| 10 | 0.99899502 |
| 20 | 0.99899732 |
| 30 | 0.99899217 |

The developed smart outlets in Section III reports a frequency and a related ROFC value every 16 ms, and based on them check if any of the switching-off conditions is satisfied. The smart outlet will turn off the switch when the switching-off conditions are satisfied for 3 times.

Based on Table II, the response of the smart outlets in case of a sudden power loss can be analyzed. A random frequency measurement error is added to each point of the frequency drop curve in FIG. 8 within the range [49.8 Hz, 49.9 Hz) to generate a new frequency drop curve with errors. The generated frequency drop curve with errors is tested based on condition 1 in Table II to check whether the switching-off condition can be satisfied for 3 times. For each case of error, 10 million frequency drop curves with errors are generated and tested to calculate the response rate. The simulation results are shown in Table III. It can be shown that the instant control strategy for smart outlets is very robust and it can act very accurately (around 99.9% probability) even in case of very significant measurement noise or errors, e.g., 30% noises.

Case studies are conducted to verify the frequency regulation performance of the instant method when the available load is sufficient, as in FIG. 10. When the power of the interconnection line is 1000 MW, the minimal controllable power that needs to be curtailed is 367 MW; and the minimal controllable power will decrease to 67 MW when the power of the interconnection line is 700 MW. It is shown in FIG. 10 for these two cases that the frequency will not drop below 49.1 Hz, and the system is secure with the power provided by the outlets.

Also, sensitivity studies are carried out to check the influence of different amount of controllable power on the contingency. Assume a sudden power loss of 1000 MW, the system frequency dynamics in case of different amounts of controllable load is presented in FIG. 11. It can be seen when the amount of controllable load is not sufficient, it is unable to prevent the frequency from dropping below 49 Hz, but it can reduce the speed of frequency drop; with the increase of the amount of controllable load, the system is increasingly secure.

What is claimed is:

1. A method for power management, comprising:
estimating power contingency of a grid at a cloud control center;
performing decentralized real-time measurement and making local decisions at one or more locally or remotely controlled outlets connected to the grid; and
aggregating distributed loads to provide emergency frequency support to the grid, wherein the control center aggregates the locally or remotely controlled outlets into hierarchical blocks based on appliance types and locations.

2. The method of claim 1, wherein in the cloud control center, performing decision-making for frequency control by determining one or more flexible loads to shed based on the power system state, total amount of flexible loads, importance of the flexible loads, and possible contingencies.

3. The method of claim 1, wherein in the cloud control center, performing decision-making for frequency control by analyzing switching-off conditions of the computer controlled outlets and send the conditions to the computer controlled outlets.

4. The method of claim 1, comprising continuously measuring a frequency of the grid at the locally/remotely controlled outlets.

5. The method of claim 4, comprising switching off one or more appliances when switching-off conditions are satisfied, or when switching-off commands sent from the cloud control center.

6. The method of claim 1, wherein the locally/remotely controlled outlets measure voltage, current, active power, reactive power, frequency, rate of frequency change (ROFC), and switch status one or more plugged-in appliances in real-time continuously.

7. The method of claim 1, wherein from measurements sent from the outlets and a total power of each block, and total power of all blocks are used to control and manage the outlets.

8. The method of claim 1, comprising updating power system model and parameters.

9. The method of claim 1, comprising determining a frequency response in the time domain as $$\Delta f(t) = -\frac{R\Delta P}{DR + K_m}[1 + \alpha e^{-\zeta\omega_n t}\sin(\omega_r t + \phi)]$$

where $$\alpha = \sqrt{\frac{1 - 2T_R\zeta\omega_n + T_R^2\omega_n^2}{1 - \zeta^2}}$$

$$\omega_r = \omega_n\sqrt{1 - \zeta^2}$$

$$\phi = \phi_1 - \phi_2 = \tan^{-1}\left(\frac{T_R\omega_r}{1 - \zeta\omega_n T_R}\right) - \tan^{-1}\left(\frac{\sqrt{1 - \zeta^2}}{-\zeta}\right)$$

-continued $$\omega_n = \sqrt{\frac{DR + K_m}{2HR \cdot T_R}}$$

$$\zeta = \frac{2HR + (DR + K_m F_H)T_R}{2(DR + K_m)}\omega_n$$

$\Delta f$ (t) is the frequency change; R is a constant of the governor speed-droop control; $\Delta P$ is the initial power loss; D is the amount of load damping which indicates the sensitivity of the load in response to frequency change; $K_m$ is the power gain factor; H is the equivalent inertia constant of the system; $\Delta P_{sp}$ is the change of the generator power set point; $F_H$ is the fraction of the power generator by the reheat turbine.

10. The method of claim 1, comprising receiving an initial power loss $\Delta P$ at time $t_0=0$, and determining a rate of frequency change (ROFC) g (t) as:

$$g(t) = \frac{d\Delta f(t)}{dt} = -\frac{\alpha\omega_n R\Delta P}{DR + K_m}e^{-\zeta\omega_n t}\sin(\omega_r t + \emptyset_1)]$$

11. The method of claim 1, 3, when the ROFC is zero, comprising determining a minimumn frequency $f_{nadir}$ and a time $t_{nadir}$ taken to reach $f_{nadir}$:

$$t_{nadir} = \frac{\pi - \emptyset_1}{\omega_r} = \frac{1}{\omega_r}\tan^{-1}\left(\frac{T_R\omega_r}{\zeta\omega_n T_R - 1}\right)$$

12. The method of claim 1, comprising determining $f_{nadir}$ as:

$$f_{nadir} = f_n - \frac{R\Delta P}{DR + K_m}[1 + \alpha e^{-\zeta\omega_n t_{nadir}}\sin(\omega_r t_{nadir} + \emptyset)]$$

where $f_n$, is the pre-contingency frequency of the steady state.

13. The method of claim 1, comprising ensuring a system frequency does not drop to below a under frequency load shedding (UFLS) point while minimizing the amount of load shedding by the controlled outlets.

14. The method of claim 1 or 8, comprising determining a threshold power loss $\Delta P_s$, as $$\Delta P_s = \frac{(f_n - f_s) \times (DR + K_m)}{R \times [1 + \alpha e^{-\zeta\omega_n t_{nadir}}\sin(\omega_r t_{nadir} + \emptyset)]}$$

where $f_s$ is the minimal frequency allowed for the frequency control strategy.

15. The method of claim 1, comprising determining a minimal controllable power $\Delta P_v$, to be shed to prevent the frequency from dropping below $f_s$ as:

$$\Delta P_v = \begin{cases} \Delta P_{max} - \Delta P_s & \text{if } \Delta P_{max} > \Delta P_s \\ 0 & \text{if } \Delta P_{max} \leq \Delta P_s \end{cases}$$

where a maximum amount of sudden power deficit induced among all the contingencies is $P_{max}$.

16. The method of claim 1 or 5 comprising determing the frequency value $f_x$, and related ROFC value $g_x$, after the loss of power $\Delta P_s$, at time at any time $t_x$ as $$f_x = f_n - \frac{R\Delta P_s}{DR + K_m}[1 + \alpha e^{-\zeta\omega_n t_x}\sin(\omega_r t_x + \emptyset)]$$

$$g_x = \frac{\alpha\omega_n R\Delta P_s}{DR + K_m}e^{-\zeta\omega_n t_x}\sin(\omega_r t_x + \emptyset_1)$$

17. The method of claim 1 or 5 comprising locally determining the switching as: if the real-time frequency measurement is $f_x$, and at the same time the ROFC measurement is lower than $g_x$, the switching-off condition is satisfied, for robustness, the locally/remotely controlled outlet will switch off when the switching-off condition is satisfied for multiple times.

* * * * *